Oct. 29, 1929.  E. A. ILEMAN  1,733,600
THERMOMETER
Filed June 30, 1926
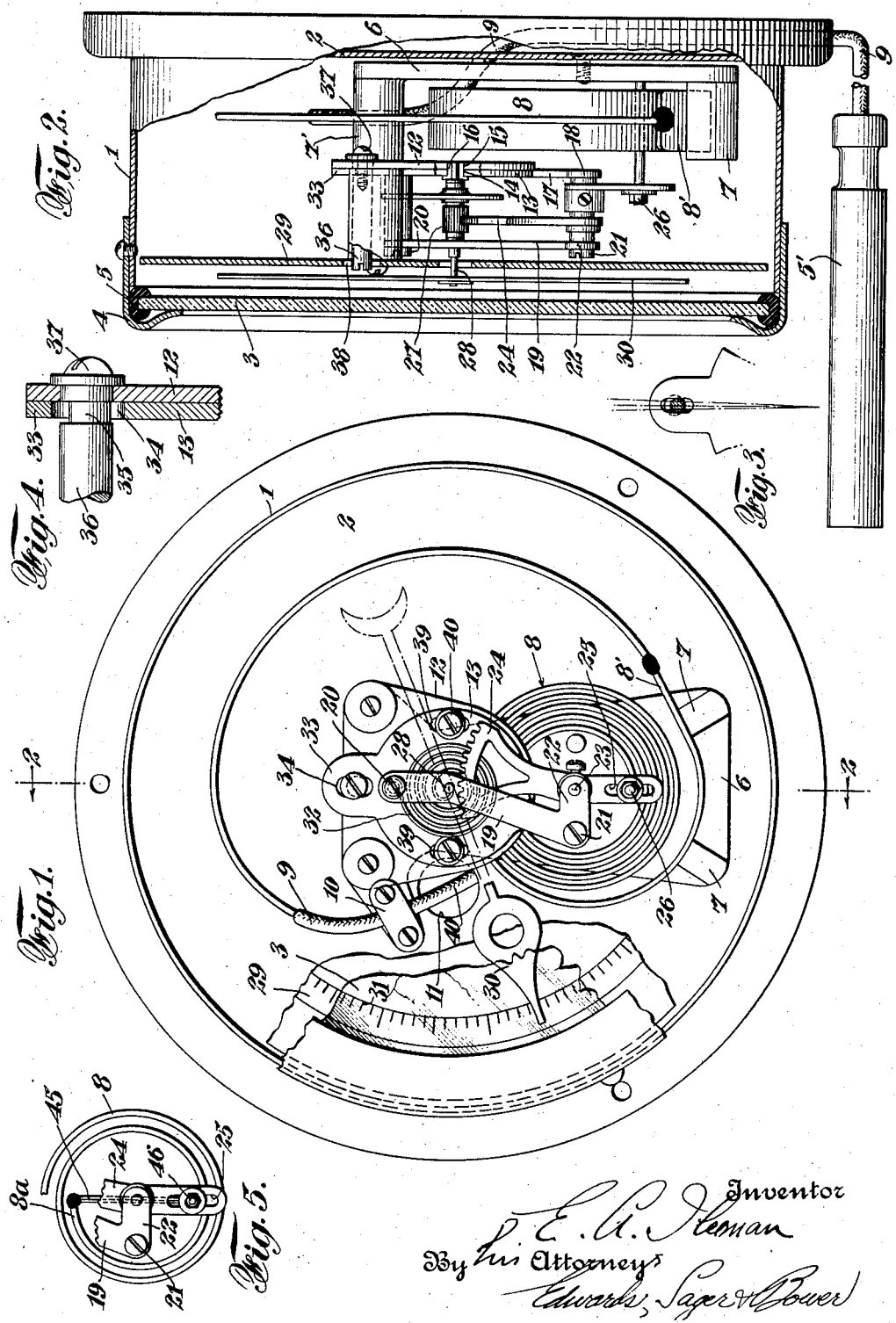
Inventor
E. A. Ileman
By his Attorneys
Edwards, Sager & Bower Patented Oct. 29, 1929

1,733,600

UNITED STATES PATENT OFFICE

EMIL AUGUST ILEMAN, OF QUEENS, NEW YORK, ASSIGNOR, BY MESNE ASSIGNMENTS, TO CONSOLIDATED ASHCROFT HANCOCK COMPANY, INC., OF NEW YORK, N. Y., A CORPORATION OF DELAWARE

THERMOMETER

Application filed June 30, 1926. Serial No. 119,548.

This invention relates generally to indicating instruments such as thermometers, pressure gauges, etc., and more particularly to means for connecting the sensitive member to the pointer movement and further means for adjusting the relative position between a movable indicating pointer and a dial.

Instruments of this general type usually employ a movable indicating member, such as a pointer, attached to a shaft which carries a pinion meshing with a gear segment. The segment usually is connected to the sensitive member by means of a link so that upon expansion or contraction thereof the pointer will move. Indicating instruments of this type have characteristics which make it desirable to be able to change the position of the pointer in relation to the graduations on the dial without changing the calibration of the instrument.

It is an object of this invention to provide means for connecting the sensitive member directly to the segment, eliminating thereby the friction and backlash entailed by the use of a connecting link. This connection is made in such a manner as to avoid any strain on the sensitive member or the segment bearings due to non-uniformity of the sensitive member.

It is a further object of my invention to provide improved means for effecting pointer adjustment, preferably from the exterior of the mechanism. In one specific aspect of the invention this adjusting mechanism comprises a movement mechanism frame mounted for pivotal movement about the pointer axis, the frame having an adjustable and self-locking positioning means. A further object is to so arrange the structure that the adjustable means may be readily and easily actuated while having full vision of the degree of pointer movement during adjustment. Another object of my invention is to provide improved means whereby the sensitive element may be held stationary and pointer adjustment effected. It is a more specific object of the invention to provide improved means whereby this adjustment may be effected without subjecting the sensitive element to undue strains which, if present, might introduce a certain degree of inaccuracy into the instrument.

Another object of my invention is to provide a new arrangement of parts, such as between the sensitive element and movement, and other parts, thereby to obtain a more compact instrument.

Further objects and advantages of my invention will appear from the following description, taken in connection with the accompanying drawing, in which Fig. 1 is a front elevation, partly broken away to show details of construction;

Fig. 2 is a vertical transverse section on line 2—2 of Fig. 1;

Fig. 3 is a fragmentary sectional view of the eccentric adjusting mechanism;

Fig. 4 is a vertical transverse section through the eccentric mechanism, and

Fig. 5 is a fragmentary view of a modified form of connection between the sensitive element and pointer.

In the illustrated embodiment of my invention I have shown the usual type of casing suitable for thermometers, pressure gauges or the like, comprising an annular portion 1 and a back 2 upon which the indicating mechanism is mounted. A glass front 3 is held in position as by an annular flanged ring 4 and suitable rubber packing 5, thereby protecting the indicating mechanism disposed within the casing.

The indicating mechanism comprises a support 6 secured to the back 2 in any suitable manner. Projecting outwardly from the lower portion of the base or support 6 are a pair of lugs 7 which support a coiled sensitive element 8, the outermost coil of which is fastened to lugs 7 as by soldering or other suitable means.

Leading from the fixed end 8' of the sensitive coil is a small tube 9 suitably covered as by any wear-resisting material and supported by a bracket 10 carried on the upper portion of the base 6. An opening 11 permits the covered tube 9 to pass to the rear of back 2, connecting to thermometer bulb 5'. Projecting outwardly from the upper end of the base 6 are two lugs 7', to which a plate 12 is secured.

The motion-transmitting or movement mechanism for the pointer is mounted upon the plate 12 and comprises a back plate 13 having an opening 14 in alignment with an opening 15 in the plate 12. A small flanged bushing 16 secured in the opening 14 projects into the opening 15 to form a journal for the movement. The plate 13 has a downwardly extending arm 17 from which an arm 18 projects laterally. Spaced from the plate 13 is an arm 19 which is secured to the plate as by a screw 20 and to the arm 17 as by a screw 21, suitable spacing blocks being provided between the arm 19 and the plate 13. The arm 19 has a laterally projecting portion 22 in alignment with the arm 18, thereby providing bearings for a shaft 23 which carries a gear segment 24. The lower portion of the segment arm has a slot 25 receiving a pin 26 which is secured to the movable end of the inner coil of the sensitive element 8. The pin 26, after being disposed within the slot, may be held in rigid relation thereto by soldering or other suitable means. A pinion 27, fixed to a shaft 28 which is journalled in the arm 19 and the bushing 16, meshes with the gear segment. The shaft 28 extends through a dial 29 and carries a pointer 30 which will indicate upon pivotal movement thereof the degree of temperature or pressure, as by any suitable graduations 31. A coiled hair spring 32 has one end fixed to the spacing block, while the inner end is fixed to the shaft 28. This spring constantly urges the pinion and gear together in one direction and thereby prevents any slack between the teeth or other parts from affecting the position of the pointer during its reverse movements.

Adjusting mechanism for the pointer comprises a lug 33 projecting upwardly from the plate 13 and has a slot 34 within which an eccentric portion 35 of a shaft 36 is mounted. The shaft 36 is journalled and held in the back plate 12 by a screw 37 threaded in the end of the shaft and extending through a washer. This shaft projects forwardly through an opening 38 in dial plate 29. A slot is formed in the outer end of shaft 36 but it will of course be understood that any suitably shaped end may be provided, such as to receive a key or the like. A pair of diametrically opposed arcuate slots 39 formed in the plate 13, each receive a screw 40, which has threaded engagement with the plate 12. The screws 40 may, if desired, clamp the plate 13 against movement or may simply hold the plate 13 and bushing 16 in pivotal relation to the plate 12.

Thus the plate 13 and arm 19 form a supporting frame for the pointer shaft, segmental gear, and pinion, this frame and mechanism comprising what is termed a movement, and the same is pivotally mounted upon the plate 12 as by the bushing 16.

In operation, the increase in volume of the fluid with which a thermometer system is filled will effect expansion of the sensitive element 8 and accordingly cause movement of the segment arm 24 about the pivot 23. To adjust the pointer relative to the dial the operator will remove the glass cover 3 and by rotating the shaft 36 cause eccentric 35 to rotate plate 13 and the arm 30. During this movement, pin 23 will move segment 24 about pin 26, thereby rotating the pinion and accordingly adjust the pointer.

The sensitive element 8, due to its construction and the particular arrangement thereof with regard to the segment, will permit a certain amount of sidewise movement of the coils depending upon the direction of pointer movement. This sidewise coil movement is such as to permit adjustment of the pointer without subjecting the sensitive element to any appreciable strains and therefore the accuracy of the instrument is maintained. This sidewise movement is permitted not only due to the particular arrangement of elements, but also due to the fact that the coils are substantially flat and accordingly flex readily.

The construction of sensitive element 8 may vary according to the type of instrument. If part of a thermometer system it may be desirable to interpose a compensating member between the free end $8_a$ and pin 46 to compensate for the effect of a temperature change of parts of the thermometer system other than the bulb.

The compensating member may either extend diametrically across the inside of the sensitive element or else continue the spirally shaped coils of the same to the extent necessary. As shown in Fig. 5 there is soldered or otherwise secured to the sensitive element 8 a compensating device 45 composed of two dissimilar metals such as brass and steel. The other end of said compensating device is soldered or otherwise secured to the pointer arm as at 46. The compensating action is accomplished by having the dissimilar metals so proportioned that should the sensitive element expand due to its own temperature change, said temperature change will also cause flexure of device 45 in the opposite direction thereby causing the connection point 46 to remain stationary.

I claim:

1. An instrument having in combination a base, a sensitive element carried thereby, a plate, means whereby said plate is carried by said base in front of said sensitive element, a movement mechanism including a frame and a rotatable pointer shaft, means for pivotally supporting said frame on said plate about an axis in alignment with the pointer shaft, and adjusting mechanism for said movement including a member carried by said base and projecting forwardly therefrom.

2. An instrument having in combination a movable indicating member, actuating means therefor including a coiled sensitive element, means for securing one portion of said coil against movement while another portion of said coil is connected to said indicating member for movement, said points of connection to said coiled sensitive element being on the same side of the center of the coils thereof, and means for adjusting said indicating member while the immovable portion of said coil remains stationary.

3. An instrument having in combination a movable indicating member, means for actuating the same including an expansible sensitive element having a plurality of coils, and means for holding an outer coil thereof stationary and for operatively connecting the free end of an inner coil thereof to the pointer, said means comprising a member turning on an axis at the center of said coils and directly connected to the free inner end of said inner coil.

4. An instrument having in combination a housing, a base supported thereby and having a forwardly projecting portion, a coiled sensitive element having its coils extending radially in a plane substantially parallel to said base, a movement mechanism movably supported by said forwardly projecting portion of said base, and overlying said sensitive element, said mechanism comprising a rotatable member having an axis at the center of said coiled sensitive element, means rigidly connecting said sensitive element to said rotatable member and adapted to permit movement of said movement mechanism, while said sensitive element remains stationary, and indicating mechanism associated with said movement mechanism.

EMIL AUGUST ILEMAN.